S. I. FEKETE AND S. G. BAITS.
MOTOR VEHICLE BODY.
APPLICATION FILED AUG. 16, 1919.

1,333,609.  Patented Mar. 16, 1920.

INVENTORS:
Stephen I. Fekete & Stuart G. Baits
by Macleod, Calver, Copeland & Dike
Attys.

UNITED STATES PATENT OFFICE.

STEPHEN I. FEKETE AND STUART G. BAITS, OF DETROIT, MICHIGAN, ASSIGNORS TO ESSEX MOTORS, OF DETROIT, MICHIGAN, A CORPORATION OF MICHIGAN.

MOTOR-VEHICLE BODY.

1,333,609.     Specification of Letters Patent.     Patented Mar. 16, 1920.

Application filed August 16, 1919. Serial No. 317,955.

*To all whom it may concern:*

Be it known that we, STEPHEN I. FEKETE, a subject of the King of Hungary, residing at Detroit, county of Wayne, State of Michigan, and STUART G. BAITS, a citizen of the United States, residing at Detroit, county of Wayne, State of Michigan, have invented a certain new and useful Improvement in Motor-Vehicle Bodies, of which the following is a specification, reference being had therein to the accompanying drawings.

Our invention has for its object a new and improved body for motor vehicles or other vehicles which are driven by internal combustion engines and are moved through the air at very high rates of speed. As is well known to those skilled in the art, the speed at which a motor vehicle can travel is, in part, limited by the shape of the body. Furthermore, it is well known that the power necessary to drive the motor vehicle at a given speed may be reduced by giving the body a so-called stream-line shape which reduces the wind resistance. At the present time, internal combustion engines used to drive high speed motor vehicles are ordinarily provided with fluid cooling systems which include a radiator exposed to the current of air through which the vehicle passes. Vehicle bodies provided with radiators are constructed at the present time in such a manner that they have a large wind resistance, and therefore an unnecessary amount of power is required to drive them at a given speed.

The object of the present invention is therefore to provide a body combined with a radiator which shall have a minimum of wind resistance but at the same time such that the radiator will produce a maximum cooling effect.

The invention will be fully understood from the following description when taken in connection with the accompanying drawings, and the novel features thereof will be pointed out and clearly defined in the claims at the close of this specification.

In the drawings, Figure 1 is a top plan view of a motor vehicle embodying our invention.

Figure 1:
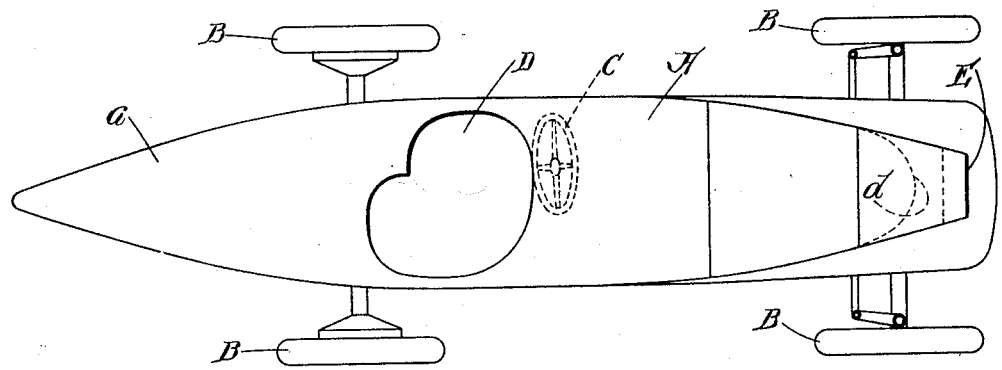
Figure 2:
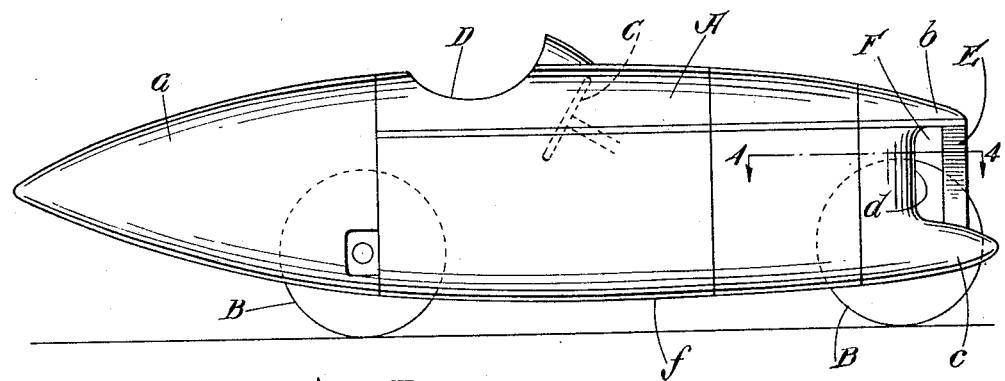
Fig. 2 is a side elevation, the right-hand wheels being omitted.
Figure 3:
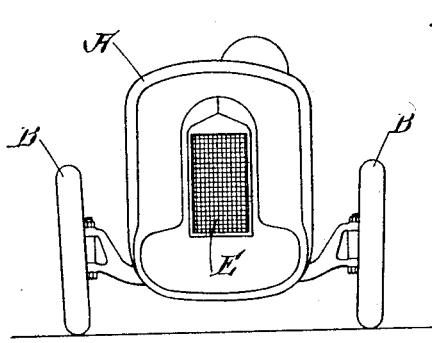
Fig. 3 is a front elevation.

Referring now to the drawings, the body is shown at A, the wheels at B, the steering wheel at C and the body opening or cockpit at D. The rear end of the body is provided with a pointed stream-line tail $a$. The front end of the vehicle is of peculiar shape, being provided with a radiator E. The body A has a top overhang $b$ and the bottom overhang $c$, and the radiator E extends from the bottom overhang to the top overhang, there being a vacant space F behind the radiator. The wall or nose $d$ of the body which is behind the radiator is given a stream-line shape, as shown in section in Fig. 4. Likewise, both upper and lower surfaces of the overhang $c$ and the upper surface of the overhang $b$ are given a stream-line shape, said stream-line surfaces merging with the proximate surfaces of the nose $d$ which is behind the radiator. The radiator E is preferably made with large air spaces to permit as free movement as possible of air through the radiator. The under surface of the body is also stream-lined, as indicated at $f$.

Figure 4:
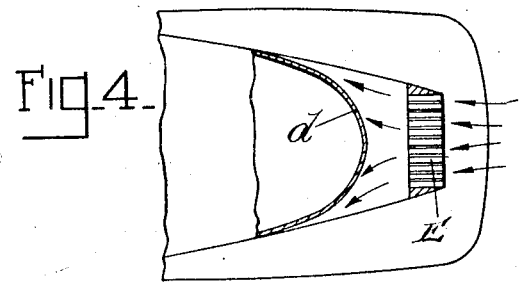
Fig. 4 is a section on line 4—4 of Fig. 2.

From the foregoing, it will be seen that the stream of air which passes through the radiator is separated into two streams by the nose $d$ of the body and passes out through the sides of the opening F along the sides of the vehicle, as indicated by the arrows in Fig. 4. By giving the body a stream-line shape herein described and by placing the radiator in advance of the solid stream-line nose of the body, the wind resistance of the vehicle is very much reduced and consequently the speed which may be produced by an engine of a given power is greatly increased without, in any way, diminishing the cooling effect of the radiator.

What we claim is:

1. A body for a motor vehicle having a stream-line nose and a radiator supported in advance of the said nose.

2. A body for a motor vehicle having a stream-line nose, a stream-line overhang and a radiator supported by the said overhang and located in advance of said stream-line nose.

3. A body for a motor vehicle having a stream-line nose, two overhangs, at the bottom and top respectively of the stream-line nose, a radiator located between the said two overhangs in advance of said nose, the sides of the space between the radiator and the nose being open so that the stream of air passing through the radiator may be split into two streams which will pass along the sides of the vehicle.

In testimony whereof we affix our signatures.

STEPHEN I. FEKETE.
STUART G. BAITS.